United States Patent [19]
McMahan et al.

[11] Patent Number: 4,794,495
[45] Date of Patent: Dec. 27, 1988

[54] HEADLAMP ASSEMBLY

[75] Inventors: David R. McMahan; Richard W. Nicholas; Thomas E. Persing; John D. Geddie, all of Anderson, Ind.

[73] Assignee: General Motors Corporation, Detroit, Mich.

[21] Appl. No.: 85,935

[22] Filed: Aug. 17, 1987

[51] Int. Cl.⁴ ............................................. B60Q 1/06
[52] U.S. Cl. ................... 362/66; 362/273; 362/289; 362/417; 362/424; 33/613; 356/249
[58] Field of Search ............ 362/61, 66, 68, 80, 362/83, 269, 273–275, 287–289, 371, 419, 424, 426–428; 33/180 L; 356/249

[56] References Cited
U.S. PATENT DOCUMENTS

| | | | |
|---|---|---|---|
| 3,088,216 | 5/1963 | Jesonis | 356/249 |
| 3,612,854 | 10/1971 | Todd et al. | 33/180 L |
| 4,414,614 | 11/1983 | McMahan et al. | 362/80 |
| 4,491,901 | 1/1985 | Sigety, Jr. | 362/80 |
| 4,554,617 | 11/1985 | Tyler | 362/61 |
| 4,584,634 | 4/1986 | Sigety, Jr. | 362/289 |
| 4,599,681 | 7/1986 | McMahan et al. | 362/80 |

FOREIGN PATENT DOCUMENTS 192688 11/1906 Fed. Rep. of Germany ...... 356/249

Primary Examiner—Samuel Scott
Assistant Examiner—Noah Kamen
Attorney, Agent, or Firm—Edward J. Biskup

[57] ABSTRACT

A headlamp assembly having a retainer ring for supporting a lamp unit and which includes a level device that allows the lamp unit to be readily aimed about a horizontal axis.

5 Claims, 3 Drawing Sheets

HEADLAMP ASSEMBLY

This invention concerns headlamps in general and, more particularly, concerns a mounting arrangement for a so-called mini-headlamp unit.

The increasing emphasis on aerodynamics in motor vehicle design has caused the hood to slope sharply towards the front bumper so as to provide an ultra-sleek appearance and also a good drag coefficient. As should be apparent, this design trend has resulted in less space at the front end of the vehicle for the headlamps and has therefore produced the need for head lamps as well as headlamp adjustment mechanisms that are smaller in size so they can be incorporated within the decreasing space available at the front end of the vehicle.

SUMMARY OF THE INVENTION

Accordingly, the present invention concerns a mini-headlamp assembly that permits mounting within a small area and can be readily adjusted in position without requiring special equipment to do so. In the preferred form, the headlamp assembly according to the present invention is adapted to be mounted to a support panel at the front end of a vehicle and includes a rectangular lamp unit formed with a radially outwardly extending flange which surrounds the lamp unit adjacent the lens thereof. The flange is provided with an outer vertical surface which has three aiming pads formed thereon that define an aiming plane. A pair of laterally spaced pivot members are adapted to be secured to the front end of the support panel and cooperate with a rectangular retainer member which supports the lamp unit. The retainer member has a configuration which conforms to the flange of the lamp unit and comprises a pair of vertically spaced horizontal sections and a pair of horizontally spaced vertical sections, all of which are interconnected to form a rectangular ring-like member. Each of the sections is L-shaped in cross-section having a first wall located in a common substantially vertical plane and a second wall which lies in a plane which is substantially perpendicular to the first wall. The horizontal sections have integral tabs formed therewith which are bent over the flange for maintaining the lamp unit within the retainer member with the aiming pads contacting the first wall of at least two of the sections. Also, the vertical sections of the retainer member each has an intermediate portion which cooperates with the pair of pivot members for allowing the lamp unit to be pivotable about a horizontal aim axis. In addition, a spring is provided between the support panel and one of the horizontal sections of the retainer member and cooperates with an adjustment screw connected between the other of the horizontal sections and the retainer member for maintaining the lamp unit in an adjusted position and permitting adjustment of the position of the lamp unit about the horizontal aim axis. A level device is also attached to the retaining ring and provides a visual indication from above and from the front of the headlamp assembly that the lamp unit is properly aimed about the horizontal aim axis.

The objects of the present invention are to provide a new and improved headlamp assembly which can be preadjusted in a horizontal plane upon installation in a motor vehicle so that subsequently only adjustment in a vertical plane is necessary;

to provide a new and improved headlamp assembly which is mountable in a small area at the front end of a vehicle and includes a minimal number of parts to support a lamp unit and provides adjustable movement thereof about a horizontal aim axis and a vertical aim axis;

to provide a new and improved headlamp assembly having a retainer ring for supporting a lamp unit and which includes a level device that allows the lamp unit to be readily adjusted about a horizontal aim axis;

to provide a new and improved headlamp assembly which includes a retainer member connected to the flange of a lamp unit for supporting the latter and includes a level device for allowing aiming of the lamp unit in a vertical plane; and to provide a new and improved headlamp assembly having a pair of pivot members which cooperate with a ringlike retainer member for mounting a headlamp unit to a support panel at the front end of a motor vehicle and is combined with a spring device and a screw device for allowing the lamp unit to be selectively adjusted about a horizontal aim axis.

BRIEF DESCRIPTION OF THE DRAWINGS

Other objects and advantages of the present invention will be more apparent from the following detailed description when taken with the drawings in which.

DESCRIPTION OF THE PREFERRED EMBODIMENT

Figure 1:
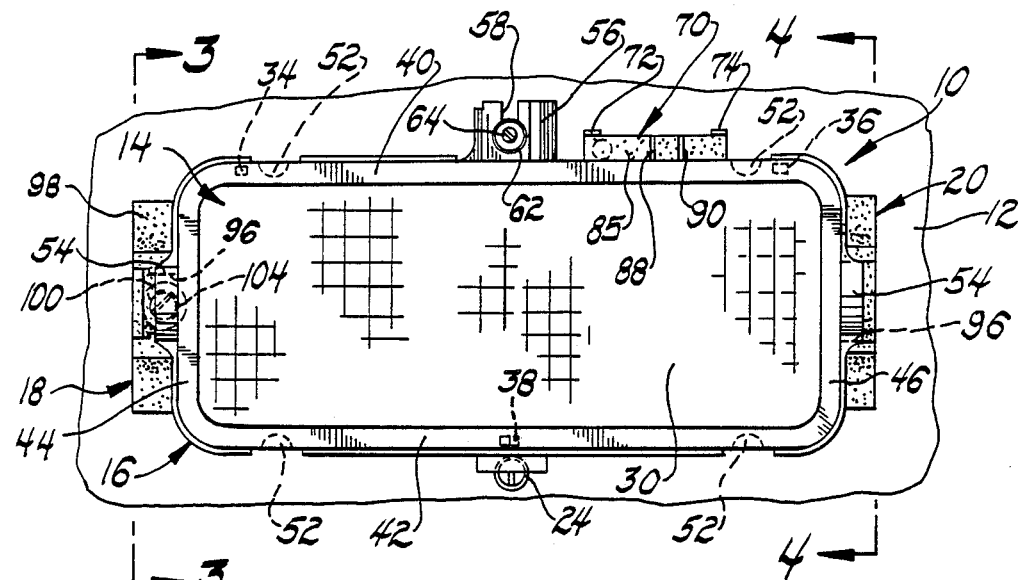
FIG. 1 is a front elevational view showing a headlamp assembly according to the present invention mounted to a support panel at the front end of a motor vehicle.
Figure 2:
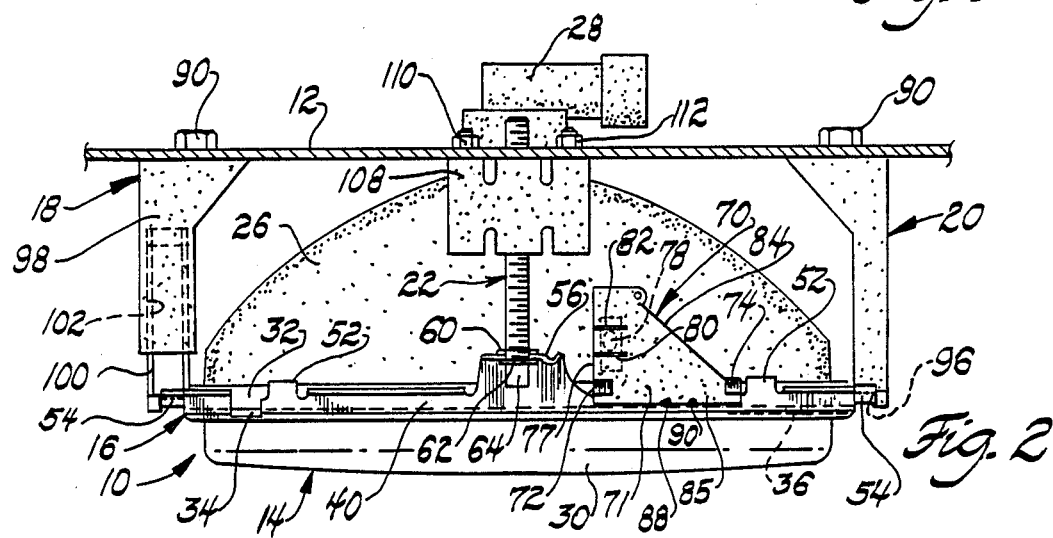
FIG. 2 is a top plan view, partly in section, of the headlamp assembly shown in FIG. 1.
Figure 3:
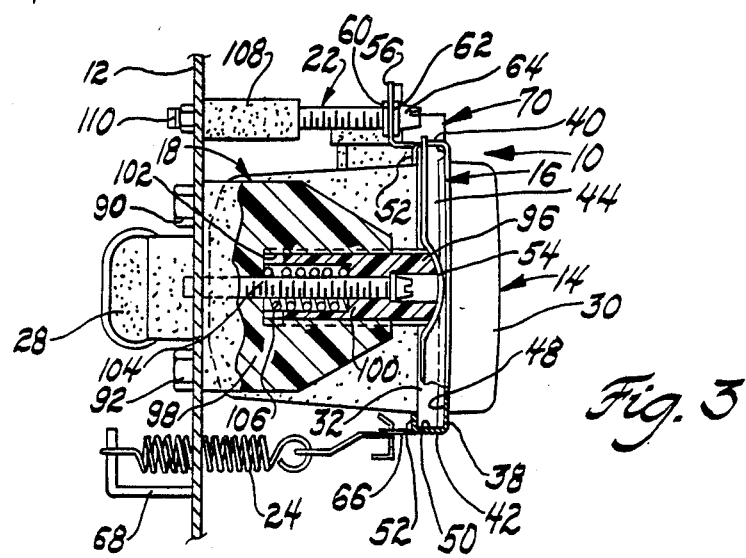
FIG. 3 is a side elevational view, partly in section, taken on line 3—3 of FIG. 1.
Figure 4:
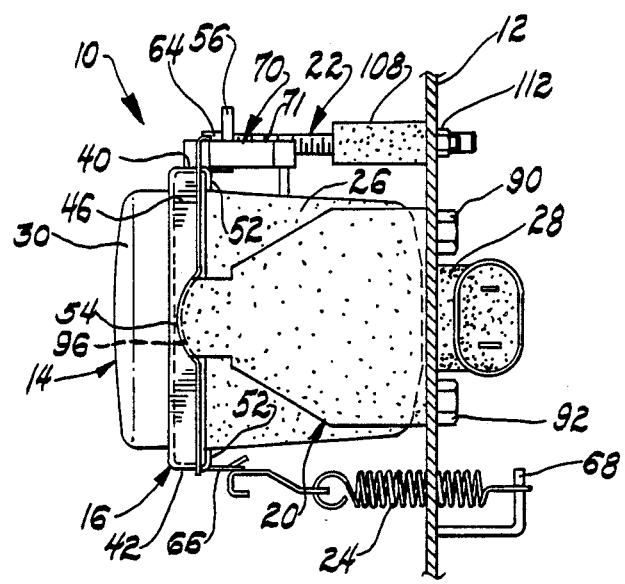
FIG. 4 is a side elevational view taken on line 4—4 of FIG. 1.
Figure 5:
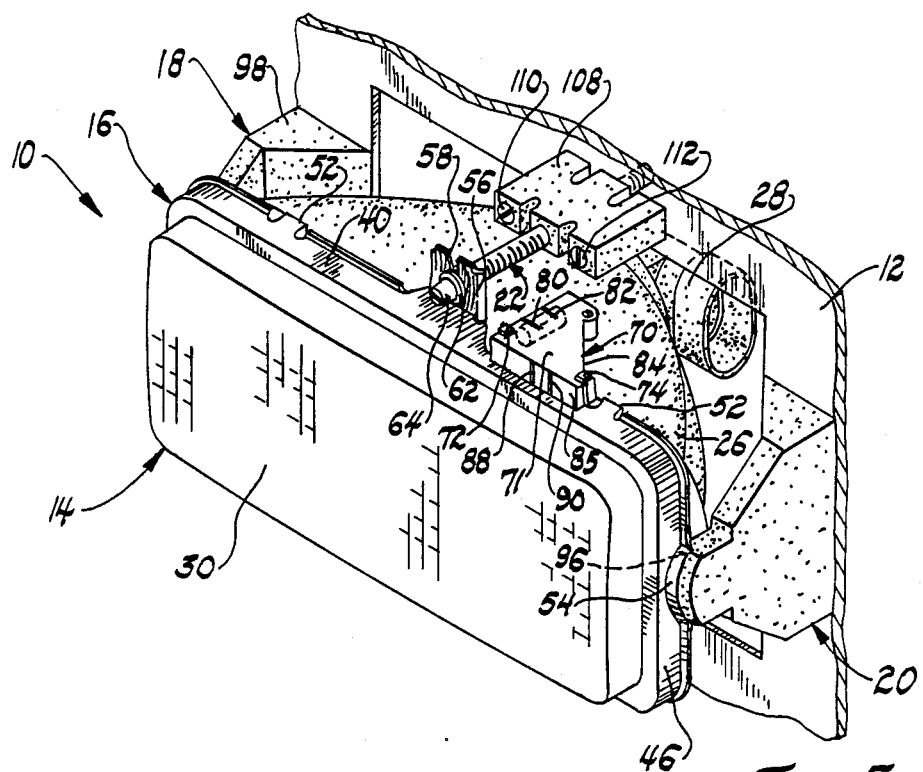
FIG. 5 is a perspective view of the headlamp assembly shown in FIGS. 1 through 4.

Referring now to the drawings and, more particularly, to FIGS. 1 through 3 thereof, a headlamp assembly 10 made according to the present invention is shown mounted to a support panel 12 which forms a part of the front end of a motor vehicle (not shown). The headlamp assembly 10 includes a lamp unit 14 supported by a retainer member 16 which, in turn, is connected to the support panel 12 by a pair of pivot members 18 and 20, a screw device 22 and a spring means 24.

More specifically, the lamp unit 14 incorporated in the headlamp assembly 10 is a so-called mini lamp which, in this case, takes the form of an all glass, rectangular, sealed beam unit having a body portion 26 provided with a parabolic cavity, the inner concave surface (not shown) of which is aluminized so as to serve as a reflector. A plug-type, high-efficiency light bulb 28 has its bulb portion located within the cavity and its plug portion sealed to the body portion 26 of the lamp unit 14 with the filament of the bulb portion suitably positioned to provide the desired beam which can be either a high beam or a low beam. The front of the body portion 26 is formed with a rim which is fused to a complementary rim of a lens 30 so as to provide a radially outwardly extending flange 32 which completely surrounds the lamp unit 14. The flange 32 has a vertical face provided with three aiming pads 34, 36 and 38, the terminal ends of which define an aiming plane which is perpendicular to the optical axis of the lamp unit 14.

The retainer member 16 is a metal stamping having a configuration conforming to the rectangular configuration of the flange 32 on the lamp unit 14 and comprises a pair of vertically spaced top and bottom sections 40 and 42 respectively which are horizontally orientated as seen in FIG. 1. The top and bottom sections 40 and 42 are connected at their opposed ends to a pair of horizontally spaced and vertically orientated side sections 44 and 46. As seen in FIG. 3, each of the sections 40–46 is L-shaped in cross-section and consists of a first wall having a flat rear surface 48 located in a common substantially vertical plane and a second wall having a flat surface 50 which lies in a plane perpendicular to the first wall. The lamp unit 14 is supported by the retainer member 16 and, in this regard, note that its flange 32 is located within the sections 40–46 of the retainer member 16 and integral tabs 52 formed with the top and bottom sections 40 and 42 are bent over the flange 32 so as to cause the aiming pads 34, 36 and 38 to contact the surface 48 of the first wall of each section 40 and 42. As aforementioned, the surface 48 of the sections 40–46 is in a common plane, and therefore with the terminal ends of the aiming pads 34, 36 and 38 contacting the surface 48, the retainer member 16 becomes an aiming ring. Also, each of the side sections 44 and 46 is formed with a curved portion 54 located mid-way between the ends of the associated side section. The curved portion 54 of the sections 44 and 46 cooperates with the pivot members 18 and 20 for supporting the retainer member 16 and, in turn, the lamp unit 14 for adjustable movement in a vertical plane about a horizontal aim axis. Also, the top section 40 is formed with an upstanding and integrally formed bracket 56 having a U-slot 58 which receives the annular slot between annular collars 60 and 62 formed to the rear of the head 64 of the adjustment screw 22 for purposes to be explained hereinafter. In addition, the bottom section 42 has an integral tongue 66 to which is attached the front end of the coil spring 24, the rear end of which is secured to a leg 68 rigidly formed with the support panel 12.

Figure 6:
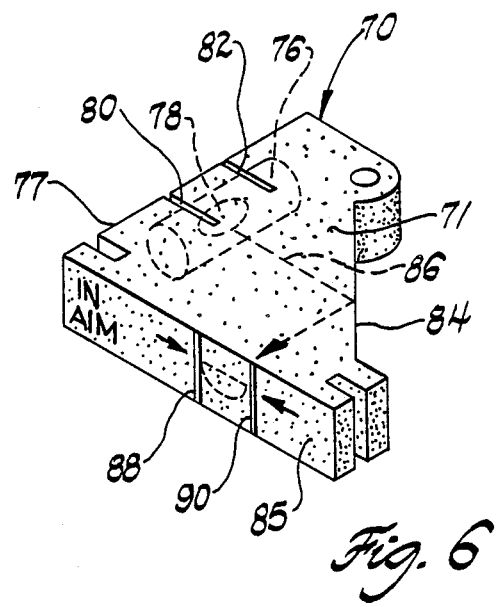
FIG. 6 is a perspective view of the level device incorporated with the headlamp assembly seen in FIGS. 1 through 5.
Figure 7:
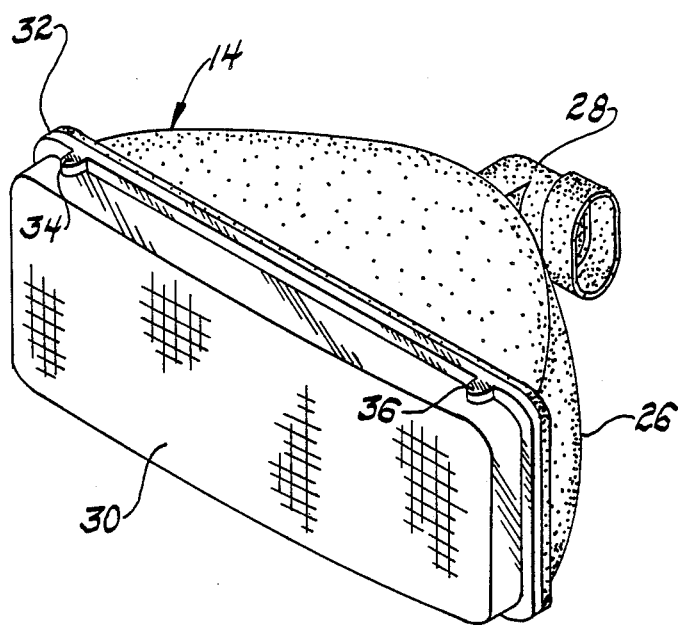
FIG. 7 shows the lamp unit incorporated in the headlamp assembly seen in FIGS. 1 through 6.

A level device 70 having a clear plastic body 71 is also incorporated with the retainer member 16 and held in place by a pair of tabs 72 and 74 integral with the top section 40. The level device 70 has a cylindrical chamber 76 formed along one edge 77 thereof, and the level device when assembled to the retainer member is adjusted to have the longitudinal center axis of the chamber 76 perpendicular to the plane of the surface 48 of the sections 40–46 of the retainer member 16. As seen in FIG. 6 and as is conventional, the chamber 76 is filled with a viscous fluid entrapping a gas bubble 78 which moves within the confines of the chamber 76 as the level device 70 moves with the attached retainer member 16. As is conventional with levelling devices, the chamber 76 has a slight internal arc providing a high point midway in the chamber 76 as indicated by the markings 80 and 82. Thus, when the gas bubble 78 is between the lines, the retainer member 16 and, accordingly, the lamp unit 14 is in proper aim in a vertical plane. As seen in FIG. 2, the bubble 78 is located between the two markings 80 and 82 and therefore in proper aim. One feature of the level device 70 is that it has a polished flat surface along edge 84 which is at an angle of 45° relative to the edge 77. The polished surface is positioned so that, and as seen in FIG. 6 when the level device 70 is viewed from its front end the chamber 76 is reflected to the front surface 85 as indicated by the dotted line 86, and by appropriately located markings 88 and 90 on the front surface 85, one can determine whether the lamp unit 14 is properly aimed. Accordingly, the level device 70 not only permits proper aim about a horizontal axis to be observed from above the headlamp assembly 10 but also from the front thereof when the screw 22 is manually rotated by a tool such as a screw driver.

Each of the pivot members 18 and 20 is secured to the support panel 12 at its rear end by a pair of screws 90 and 92. The front end of each pivot member 18 and 20 is formed with a pivot surface 96 which is convex in configuration and complementary to and received by the associated curved portion 54 formed with the retainer member 16. The pivot member 20 is a one-piece unit while the other pivot member 18 (as seen in Fig. 3) is a two-piece unit consisting of a base 98 and an axially movable arm 100 slidably received within a bore 102 formed in the base 98. An adjuster screw 104 extends through the arm 100 and its end is threadably received by the base 98 with a coil spring 106 interposed between the base 98 and the arm 100 within the bore 102. Thus, by rotation of the screw 104, the arm 100 and, accordingly, its curved pivot surface 96 can be adjusted axially relative to the base 98. Thus, the pivot surface 96 can be preset to establish the horizontal aim within limits, and for this purpose a pre-set fixture could be used at the assembly plant to locate the arm 100 for proper horizontal aim of the lamp unit 14. From the above description, it should be apparent that the spring 24 applies the retaining force to the adjusting screw 22 which is threadably received by a nut member 108 secured by screws 110 and 112 to the support panel 12. The spring 24 also causes the curve portions 54 of the retainer member 16 to apply a force to the pivot member 18 and 20 and, in this manner, holds the lamp unit 14 in the properly adjusted position. Other than the adjustment screw 22, the spring 24, in effect, serves to hold the combined headlamp unit 14 and retainer member 16 to the support panel 12. Thus, when it is necessary to replace a burnt out lamp unit 14, the spring 24 merely is detached from the tongue 66 and the bracket 56 of retainer member 16 is slipped out of the engagement with the annular slot defined by collars 60 and 62 of the adjustment screw 22 and removed from the vehicle for replacement by a new lamp unit.

Although the headlamp assembly 10 described above is intended to be preadjusted in a horizontal plane at the vehicle manufacturing plant, it should be apparent that by suitably cutting a circular opening within the curve portion 54 of the retainer member 16 adjacent pivot member 18, a screw driver could be inserted into the arm 100 from the front end thereof and by rotating the screw 104 adjustment could be realized of the lamp unit in a horizontal plane after the headlamp assembly 10 is mounted on the vehicle. Also, the same intended adjustment can be accomplished by having the adjustment screw 104 extend rearwardly through the support plate 12 and pivot member 18 to provide rear access for adjustment.

Various changes and modifications can be made in the construction of this headlamp assembly without departing from the spirit of the invention. Such changes and modifications are contemplated by the inventors and they do not wish to be limited except by the scope of the appended claims.

The embodiments of the invention in which an exclusive property or privilege is claimed are defined as follows:

1. A headlamp assembly adapted to be mounted to a support panel at the front end of a motor vehicle, said headlamp assembly including a rectangular lamp unit formed with a radially outwardly extending flange surrounding the lamp unit adjacent the lens thereof and provided with an outer vertical surface having three aiming pads formed thereon that define an aiming plane, a pair of laterally spaced pivot members adapted to be secured to said support panel, a rectangular retainer member having a configuration conforming to said flange and comprising a pair of vertically spaced horizontal sections and a pair of horizontally spaced vertical sections all of which are interconnected to form a ring-like member, each of said sections being L-shaped in cross-section and having a first wall located in a common substantially vertical plane and a second wall which lies in a plane substantially perpendicular to said first wall, tab means connected to said horizontal sections of said retainer member and bent over said flange for solely supporting and maintaining said lamp unit within said retainer member with said aiming pads contacting said first wall of at least two of said sections, said pair of vertical sections of said retainer member each having an intermediate portion thereof formed with a curved portion engaging one of said pair of pivot members so that said lamp unit can be pivoted about a horizontal aim axis, a spring between said support panel and one of said horizontal sections of said retainer member serving to maintain said curved portion of each of said pair of vertical sections in engagement with the associated pivot member, an adjustment screw connected between the other of said horizontal sections of said retainer member and said support panel for adjusting the position of said lamp unit about said horizontal aim axis, and a level device attached to said retainer member for providing a visual indication from above and from the front of said headlamp assembly that said lamp unit is properly aimed about said horizontal axis.

2. The headlamp assembly according to claim 1 wherein said level device has a body portion provided with a chamber having a gas bubble and having a reflecting surface formed on said body portion, which causes the gas bubble to be viewed from the top of and from the front of said headlamp assembly during the aiming of said lamp unit.

3. The headlamp assembly according to claim 1 wherein one of said pivot members has a slidable arm for preadjusting the position of the lamp unit in a horizontal plane.

4. The headlamp assembly according to claim 3 wherein screw means are provided for adjusting the position of said arm.

5. A headlamp assembly adapted to be mounted on a support panel at the front end of a vehicle, said headlamp assembly including a rectangular lamp unit supported by said support panel for pivotal movement about a horizontal aim axis and formed with a radially outwardly extending flange surrounding the lamp unit adjacent the lens thereof and provided with three aiming pads formed thereon that define an aiming plane, a rectangular retainer member having a configuration conforming to said flange and comprising a pair of vertically spaced horizontal sections and a pair of horizontally spaced vertical sections all of which are interconnected to form a ringlike member, means for maintaining said lamp unit within said retainer member with said aiming pads contacting portions of at least two of said sections so as to locate said retainer member in a predetermined position relative to said lamp unit and thereby serve as an aiming ring, a level device attached to one of said sections of said retainer member for providing a visual indication from the front of said vehicle that said headlamp unit is properly aimed about said horizontal aim axis, said level device including a plastic body portion having an elongated chamber the longitudinal axis of which is positioned perpendicular to a common plane passing through the intersection of each of said aiming pads with said portions of at least two of said sections, a viscous fluid in said chamber entrapping a gas bubble which moves within the confines of said chamber as the headlamp unit is adjusted about said horizontal aim axis, a viewing surface formed on said body portion and located along a line substantially parallel to said common plane, and a reflecting surface formed on said body portion which intersects said line at an angle of 45° and provides a view of the position of said gas bubble through said viewing surface so that proper Aim of said headlamp unit can be observed from the front of said headlamp unit during adjustment of said headlamp unit about said horizontal aim axis.

* * * * *